United States Patent [19]

Heiser et al.

[11] 4,233,370
[45] Nov. 11, 1980

[54] SNAP-THROUGH ANTI-IGNITION VENT CAP FOR LEAD ACID STORAGE BATTERIES

[75] Inventors: Joseph I. Heiser, Wyomissing Hills; Edgar M. Erb, Lancaster, both of Pa.

[73] Assignee: General Battery Corporation, Reading, Pa.

[21] Appl. No.: 34,416

[22] Filed: Apr. 30, 1979

Related U.S. Application Data

[60] Continuation-in-part of Ser. No. 879,461, Feb. 21, 1978, which is a division of Ser. No. 744,647, Nov. 24, 1976, Pat. No. 4,086,395, which is a continuation-in-part of Ser. No. 593,546, Jul. 7, 1975, abandoned.

[51] Int. Cl.³ ............................................. H01M 2/12
[52] U.S. Cl. .................................... 429/82; 429/89
[58] Field of Search ............... 429/72, 82, 89, 83; 220/367, 373

[56] References Cited

U.S. PATENT DOCUMENTS

| | | | |
|---|---|---|---|
| 3,879,227 | 4/1975 | Hennen | 429/88 X |
| 3,992,226 | 11/1976 | Godshalk | 429/89 |
| 4,010,044 | 3/1977 | Schaumburg | 429/82 |
| 4,072,799 | 2/1978 | Leeson et al. | 429/82 |
| 4,086,395 | 4/1978 | Heiser et al. | 429/88 |
| 4,091,180 | 5/1978 | Fox et al. | 429/89 X |
| 4,098,963 | 7/1978 | Mocas | 429/89 X |

Primary Examiner—Anthony Skapars
Attorney, Agent, or Firm—Benasutti Associates, Ltd.

[57] ABSTRACT

A vented battery cap is provided which is adapted to engage at least one of a plurality of fill holes in an automotive storage battery or similar lead acid battery and which has pressure release means for venting the combustible gases produced within that storage battery under conditions such as overcharge conditions into the atmosphere. The cap itself is comprised of substantially two portions, a base member which fits into at least one of the fill holes and a top member which snap-fits through the base member. The pressure release means comprises a plurality of extremely narrow slits on both the top and underside of the cap which have widths in the order of 0.003 to 0.005 of an inch. The remainder of the battery cap is tightly sealed to prevent any extraneous leaks of battery gases received from the automotive battery from leaking into the atmosphere. The slits are so constructed to facilitate the safe expulsion of any volume of gas normally produced by an automotive storage battery, while virtually eliminating the likelihood that ignition of gases within the atmosphere will result in explosive consequences either within the battery cap or within the battery itself.

4 Claims, 8 Drawing Figures

SNAP-THROUGH ANTI-IGNITION VENT CAP FOR LEAD ACID STORAGE BATTERIES

CROSS-REFERENCES TO RELATED APPLICATIONS

The present application is a continuation-in-part of prior co-pending patent application Ser. No. 879,461, filed Feb. 21, 1978, entitled "MULTI-SLIT SELF-SEALING IGNITION-ARRESTER BATTERY VENT," which is a divisional application of Ser. No. 744,647, filed Nov. 24, 1976, entitled "MULTI-SLIT SELF-SEALING IGNITION ARRESTER BATTERY VENT," now U.S. Pat. No. 4,086,395, dated Apr. 25, 1978, which is a continuation-in-part of prior co-pending patent application Ser. No. 593,546, filed July 7, 1975, now abandoned, entitled "IGNITION ARRESTER GANG VENT." These patent applications are incorporated by reference as if fully set forth herein.

BACKGROUND OF THE INVENTION

The present invention generally related to the field of vented battery caps, and more particularly, to the field of multiple plug vented battery caps which are designed to arrest the ignition and/or to minimize the expulsion into the atmosphere. It is well known that a suitable battery vent plug must provide for the expulsion of gases which build up during the chemical charging and discharging action of the battery, while effectively preventing the leakage or evaporation of substantial quantities of the battery electrolyte. To this end, battery vent plugs are normally designed with gaseous connection means for venting the gases produced within the battery to the atmosphere, while providing electrolyte retention means within the battery vent plug for retaining and returning as much of the electrolyte to the battery as is practically feasible. This retention of battery electrolyte is normally accomplished through the use of various baffles and/or gabled floors in the battery vent plug which tend to funnel the battery electrolyte which escapes into the battery vent plug back into the battery cells.

Originally, few provisions were made apart from those described above in order to minimize the chance that a spark in the vicinity of the battery would ignite the battery gases, thereby resulting in the possible explosion of the battery vent plug away from the battery container and/or the explosion of the battery itself. More recently, however, attention has been focused upon the desirability of minimizing the chances that a spark in the vicinity of an operating battery might indeed ignite those gases upon their expulsion to the atmosphere, and attempts have been made to insure that the inadvertent ignition of those gases does not have explosive results. One approach to solving this problem has been to provide a multiple battery vent plug in which gaseous communication is provided from the center of each plug through the body of the plug to four rectangularly widely spaced pin hole-like gas outlets in the top cover of the battery for venting these explosive battery gases to the atmosphere, presumably in a diffuse manner. Alternatively, in single battery vent plugs, the interior of the plug which is directly in communication with the battery cell communicates with a gaseous passage disposed under the top surface of the plug by a slot, having a longitudinal member disposed therein, presumably to prevent battery electrolyte from entering the gaseous passage. Two spaced pin hole-like openings are provided on the upper surface of the rather broad cap, again for the purpose of diffusing the explosive battery gases into the atmosphere.

Other designs for venting battery gases safely into the atmosphere have tended to replace these pin hole-like openings with larger cylindrical or rectangular openings into which or next to which are disposed a porous ceramic diffusers. These ceramic diffusers are particularly adapted for use in multiple battery vent plugs which have a hollow body that is adapted for the mounting of such a porous diffuser in a position intermediate between two adjacent battery plugs. One such porous diffuser for a single battery vent plug is disclosed in French Pat. No. 839,808 (1939). Alternatively, another type of microporous membrane is disclosed in U.S. Pat. No. 3,507,708, and U.S. Pat. No. 3,879,227 also discloses such a porous diffuser disposed within a multiple battery vent plug. As with most battery vent plugs, the battery vent plugs described in the above mentioned patents are normally provided with sloping surfaces and/or baffles to prevent or inhibit battery electrolyte from contacting the porous diffuser and/or other vent means.

In particular, in addition to having a porous diffuser located adjacent the atmosphere, U.S. Pat. No. 3,879,227 further discloses a compartment disposed between the porous diffuser and the atmosphere, which compartment has an elongated outlet opening to the atmosphere. The ratio of the volume in cubic inches of the compartment to the area of the elongated outlet in square inches is within a particular range. Presumably, this configuration minimizes the effect of explosions which occur in the area immediately adjacent the porous diffuser, and the size of the compartment and cross sectional area of the elongated opening are selected so as to prevent explosions which occur within the compartment from having serious consequences. To this end, the exterior surface of the compartment is constructed so that upon the ignition of gases within the compartment the elongated opening has a tendency to increase in cross sectional area, thereby venting the ignited gases directly into the atmosphere. Two additional types of multiple battery vent plugs are disclosed in U.S. Pat. Nos. 3,992,226 and 4,086,395 (which is a parent of the present application). Both of these patents provide structures with at least one venting orifice therein directed away from the battery when fitted into the battery vents, and both plugs of these patents have internal configurations which help to eliminate any possibility of the battery electrolyte passing from the battery through the vent plug.

Furthermore, at least one type of vent plug is known wherein a separate top member of the plug fastens to the inside of a bottom member that fits into the battery vent openings. In that instance, prong members project upwardly form the inside of the base member and engage a rim which runs along the inside of the top member to securely fasten the two members together.

Other patents which generally show multiple battery vent plugs include U.S. Pat. Nos. 3,284,244, 3,265,538, 3,369,940 and 3,597,280. Other battery vent patents include U.S. Pat. Nos. 3,466,199, 2,670,396 and the references cited thereon.

SUMMARY OF THE INVENTION

It is the primary object of the present invention to provide an anti-explosion battery venting means.

Another object of the present invention is to provide a battery vent which will self-extinguish battery gases diffused therefrom which are ignited in the atmosphere adjacent that battery vent, while retaining operational capacities.

A further object of the present invention is the provision of a battery vent comprising a plurality of narrow slits, the width of which slits falls within particular critical dimensions of width.

A still further object of the present invention is to provide a vent plug which can be easily assembled and wherein completed assembly can be easily determined.

An additional object of the present invention is the provision of a vent plug which not only safely expels combustible gases away from the battery, but can also safely expel these gases toward the battery, thereby making more effective use of the venting plug.

Finally, it is also another aim of the present invention is to provide a battery vent which diffuses combustible battery gases into the atmosphere in a manner which minimizes contagious combustion of all of the battery gases which are being expelled.

To achieve these various objects, a battery vent cap having pressure release means comprising a plurality of extremely narrow slits is provided. In particular, a two piece vent cap is provided wherein a cover member with slits around the circumference thereof and prongs extending downward therefrom is snap-fitted through slots in a bottom member. The wall of the bottom member coacts with the slits in the top member to form channels around the vent for the expulsion of gases upwardly away form the cap and the battery, and the combination of the prongs fitted through the slightly larger slots in the bottom member provides gas passages through the bottom member on either side of the prong which direct battery gases downwardly away from the plug toward the battery casing when the plug is in use.

Furthermore, the applicants have found that when a plurality of appropriately placed extremely narrow slits are provided between the cavity of a vent cap and the atmosphere, the ignition of combustible battery gases in the atmosphere will not travel back through those slits to cause an explosion within the interior of the battery cap or battery. The novel battery cap of the present invention further provides means whereby the ignition of combustible battery gases in the vicinity of a particular slit will frequently result in the self-closure of that slit and the self-extinguishment of the flame which is fed by gases emanating from that slit.

BRIEF DESCRIPTION OF THE DRAWINGS

The above-mentioned and additional objects of the present invention will become more readily apparent from the following detailed description taken in conjunction with the formal drawings, wherein.

DETAILED DESCRIPTION OF THE INVENTION

Figure 1:
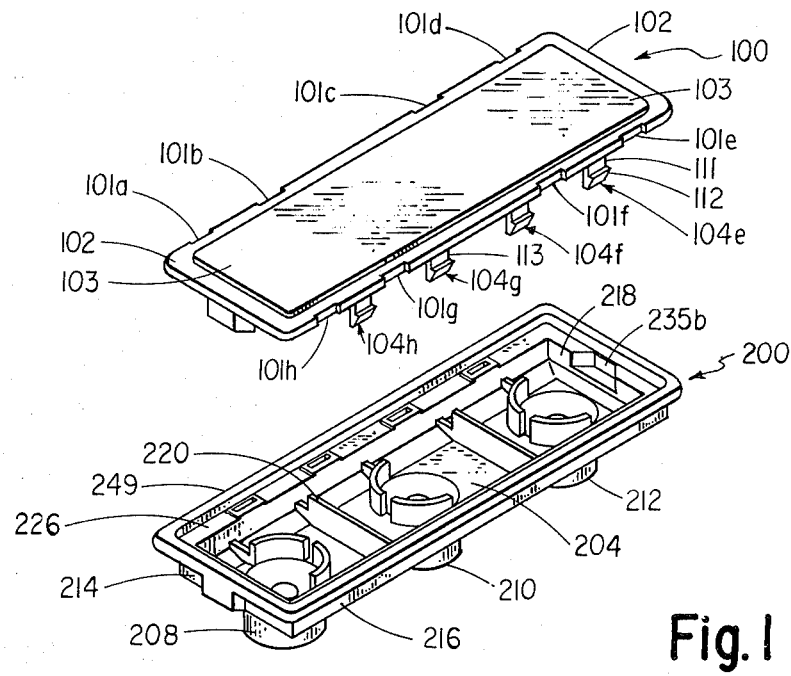
FIG. 1 is an isometric view of the present invention with the top and bottom members thereof separated from each other.

Although specific forms of the invention have been selected for illustration in the drawings, and the following description is drawn in specific terms for the purpose of describing these forms of the invention, this description is not intended to limit the scope of the invention which is defined in the appended claims.

A preferred embodiment of the vent cap or plug of the present invention is shown separated into its two components parts in FIG. 1. There is a top or cover member 100 and a bottom or base member 200 which is designed to receive and retain the top member therein. This vent cap shown in FIG. 1 is a gang vent cap and is adapted to service three fill-hole apertures of a typical lead-acid battery such as that used in an automobile.

Figure 4:
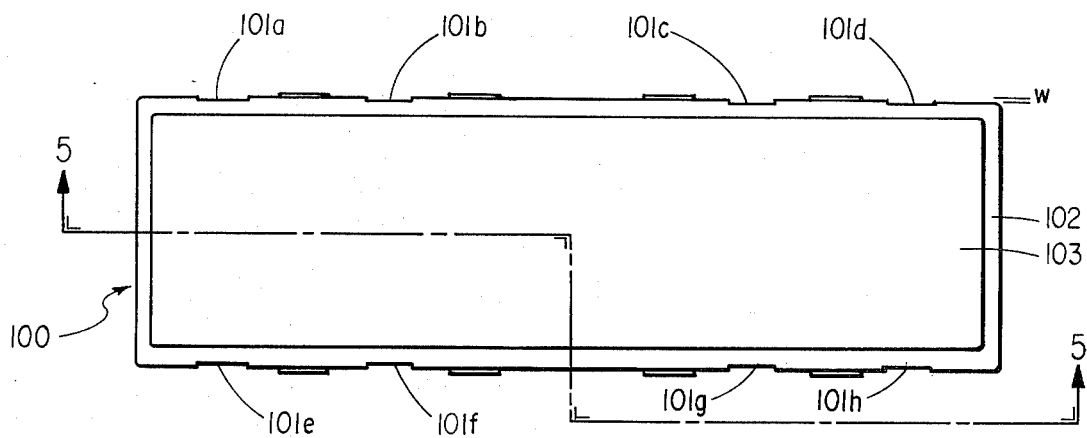
FIG. 4 is a top view of the top member.
Figure 5:
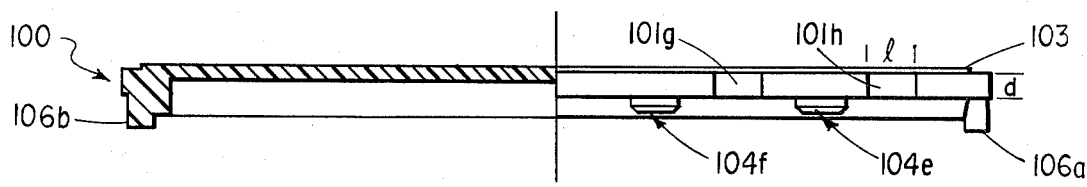
FIG. 5 is a cross section taken along the line 5—5 in FIG. 4.
Figure 6:
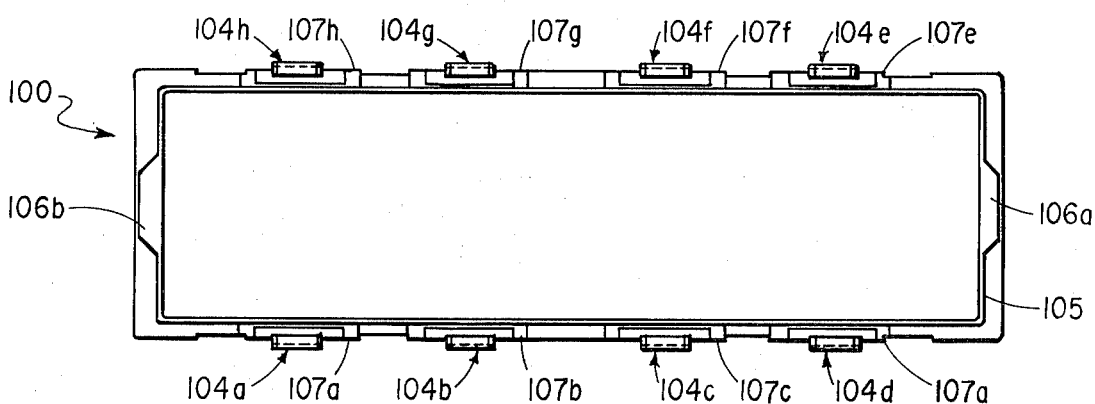
FIG. 6 is a bottom view of the top member.

Around the circumference of the top member 100 are a plurality of—in this instance, eight—slits 101a–101h. Each of the slits is approximately 0.25 of an inch long by approximately 0.080 of an inch deep by approximately 0.004 of an inch wide, as denoted by the symbols "l," "d," and "w" respectively, in FIGS. 4 and 5. These slits are formed in a top reference surface 102 which surrounds a slightly thicker top surface 103. Projecting downward from the underside of the reference surface 102 are a plurality of substantially uniformly spaced clips or prongs 104a–104h, whose function will be discussed more fully later. At the peripheral edges of the thicker top surface 103 on the underside thereof is a reference surface locating flange 105 (FIG. 6) which extends generally downwardly away from the underside of the cover member for the purpose of engaging and aligning the cover member with respect to the base member upon assembly of the vent cap. To additionally aid in locating the cover member within the base member, two end projections 106a and 106b project downwardly slightly further than the locating flange 105 at each end of the cover member. Finally, surrounding each of the clips or prongs are substantially u-shaped raised protions 107a–107h, one corresponding to each prong. These raised protions are preferably integrally formed with the underside of the reference surface and are spaced form the clips.

Figure 2:
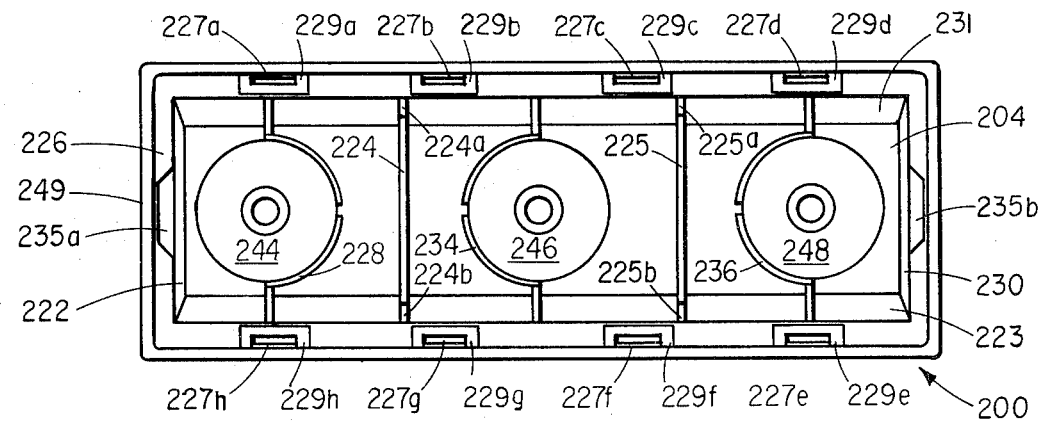
FIG. 2 is a top view of the bottom member.

With further reference to FIG. 1 and to FIG. 2, the bottom or base member 200 can be seen to comprise a substantially planar floor 204; aside walls 214, 216, 218, and 220; beveled walls 222, 223, 230 and 231; and fill hole stoppers 208, 210 and 212. Along the top edges of the side walls is a slot reference surface 226. This slot reference surface has a plurality of slots 227a–227h therethrough in locations complimentary to the prongs 104a–104h on the cover member, so that the prongs will align with these slots when the cover member is positioned over the base member. An annular rim 249 extends upwardly all of the way around the slot reference surface 226. The height of the annular rim is approximately the same as the thickness of the top reference surface 102.

Disposed within the base member 200 are a plurality of baffle means for allowing gas passing up from the battery to communicate through the vent with the atmosphere while the electrolyte within the battery which inadvertently enters the cap is retained and funneled back into the appropriate fill hole. These baffles generally comprise cross baffles 224 and 225 and fill hole baffles 228, 234 and 236; the provision of the fill hole baffles is optional.

Figure 3:
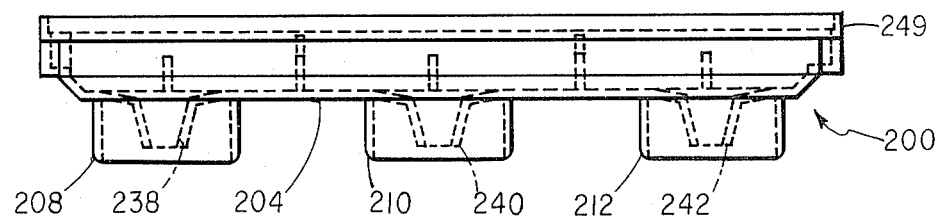
FIG. 3 is a side view of the bottom member.

Referring now generally to FIGS. 1, 2 and 3, the fill hole stoppers 208, 210 and 212 are illustrated, and this preferred embodiment vent cap is seen to comprise nipples 238, 240 and 242. The nipples are centrally disposed within each fill hole stopper and communicate with funnels 244, 246 and 248, respectively, for the purpose of funneling electrolyte back into the appropriate battery fill holes. Each nipple is seen to define a small substantially arcular aperture, the size of which is selected to ensure that, relative to the venting means described hereinafter, gases will pass freely from each battery cell to be vented into the chamber of the battery cap prior to venting. Care is taken to select an aperture which will not substantially impede the flow of battery gases to be vented, even after long periods of use, while minimizing the cross-sectional area which is available to electrolyte which may inadvertently splash up against the undersurfaces of the fill hole stoppers.

As further shown in FIGS. 1 and 2, the slots 227a-227h have there around u-shaped raised portions 229a-229h. These raised portions have a width substantially equal to, but in no event greater than, the space between the prongs 104a-104h and raised portions 107a-107h on the underside of the reference surface 102 of the cover member. Because of this dimensioning, when the cover member is fitted over the bottom member, the raised portions 229a-229h will fit within the space between the prong members and the raised portions 207a-207h.

Referring still to FIG. 1, the prongs 104a-104h are basically constructed to have a body portion 111 which extends transversely away from the plane of the reference surface 102 and have an engaging portion 112 at the end of the body portion opposite the reference surface. The engaging portion 112 is larger than the body portion at the intersection of the two portions; however, the engaging portion 112 tapers in the direction away from the body portion. A ledge or projection 113 is formed at the junction of the body portion and the enlarged portion.

Upon assembly of the vent cap, that is, the combining of the cover member and the bottom member, the prongs 104a-104h are inserted into and through the slots 227a-227h, respectively, until the ledge portions 113 of all the prongs completely pass through the slots and engage against the underside of the slot reference surface 226. At this same time, the raised u-shaped raised portions 107a-107h on the underside of prong reference surface of the cover member fit around the u-shaped raised portions 229a-229h of the bottom member, and proper alignment of the cover and bottom members is further enhanced by the complementary fitting of the locating flanges 105a-105d into within notched portions 224a-224b and 225a, 225b of the cross baffles 224 and 225 respectively. Furthermore, the end projections 106a, 106b fit into complementary depressions 235a, 235b in the base member, thereby enhancing the alignment of the two members and the durability of the assembled vent cap.

Figure 7:
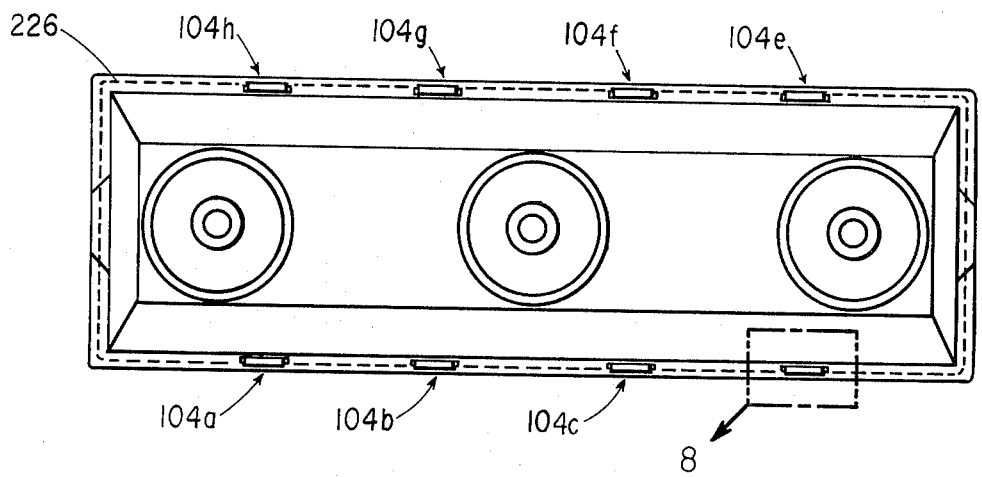
FIG. 7 is a bottom view of the fully assembled vent plug of the present application.
Figure 8:
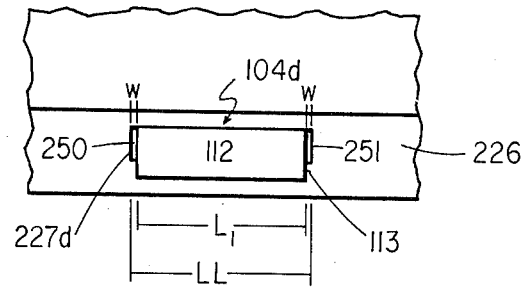
FIG. 8 is an enlarged fragmentary view of a snap-lock portion of the cap taken as indicated by the lines and arrow 8 shown in FIG. 7.

As shown in FIG. 7 and 8, the ledge 113 of each prong engages with the underside of the slot reference surface 226 when each prong is fully inserted through its respective slot. In order to accommodate dimensional irregularities along the length of the cap and in order to substantially improve the dispersion of the battery gases into the atmosphere, preferably in concentrations which will not tend to support combustion, the slots 227a-227h are sized to be slightly longer than the corresponding length of the prongs inserted therethrough. It can be seen in FIG. 8, that one or more slits 250, 251 are defined between the edges of the prong 104d and the edges of the slot 227d shown in that enlarged, fragmentary view. The width "$w_1$," as indicated in FIG. 8, of these slits on either side of the prong are preferably about 0.004 of and inch wide. Accordingly, the overall length "$L_1$" of the prong is selected to be in the vicinity of 0.007 to 0.008 of an inch shorter than the length "LL," the total length of the slot. Therefore, a pair of downwardly directed openings 250, 251 having a combined width of no more than 0.007 to 0.008 of an inch are provided at each slot on either side of the prong inserted there through, and preferably, two slots in the range of 0.004 of an inch are created.

In addition to the downwardly directed openings which result from the insertion of the prongs through the slots, upwardly directed openings are also developed as a result of channels formed by the space between the slits 101a-101h and the inside of the annular rim 249 of the bottom member when the cover and bottom members are joined. As pointed out above, the width "w" (FIG. 4) of the slit is to be approximately 0.004 of an inch; therefore, since the cover member is to fit tightly within the rim 249, the approximate width of the channels formed by the slits will be 0.004 of an inch, and of course, the length and depth of the channels will correspond accordingly to the remaining slit dimensions.

It is preferable that the components of this vent cap be made from meltable material, such as polypropylene and copolymers thereof by an injection molding process, and it has been noticed that during the molding process natural depressions are usually formed in the circumference of the reference surface 102 cover member at the sites where the prongs are formed. These depressions have a width which is not greater than 0.004 of an inch, and these depressions further enhance the venting capabilities of the vent cap.

In accordance with the present invention, the width of the slits in the bottom and the top to be incorporated as a venting means in the battery vent of the present invention is critical. In order to obtain superior ignition arresting characteristics, that is, in order to prevent a spark or flame from traveling through a venting slit back into either the cavity within the battery cap or into the battery itself, it is necessary that the width of the slit not exceed at any point along its length an absolute maximum of 0.009 inches. Due in part to problems with manufacturing tolerances, and further, in order to achieve greater reliability and superior characteristics, the venting slits of the present invention should preferably have widths in the range of 0.004 to 0.005 inches plus or minus 0.001 inches. The applicants have found that a venting means having slits with this critical width will act to prevent the transmission of a spark or flame from the atmosphere in the vicinity of one side of the venting means through the venting means to the other side of the venting means. In constructing the vent in accordance with the present invention, a plurality of narrow slits are disposed through an exterior surface of the vent and are spaced apart and angled so that ignition of and/or a flame which is fed by gases emanating through any one of the slits will not tend to ignite gases which are emanating from an adjacent one of said slits. Accordingly, it may be seen that in the preferred embodiment vent cap as illustrated in the drawings, a plurality of slits are employed which are directed downwardly away from the cap toward the battery and upwardly away from the cap and the battery.

In addition to the width and orientation of the venting slits of the present invention, the number, length of the slits, and the material which defines those slits are each believed to provide important advantages to the venting means of the present invention. In particular, the length and number of slits should be selected so that the venting means of the present invention creates a minimum air resistance to gases which are vented therefrom. Accordingly, in constructing the venting means of the present invention, the total combined length of the slits to be defined in that venting means are selected to produce gas resistance characteristics which permit adequate gas flow. The number of such slits which may be incorporated in the venting means of the present invention may vary, however it is believed that a minimum of two slits oriented in generally opposing directions is preferred so that in the event of self-sealing and self-extinguishment, a given battery vent will still retain its venting capabilities. More particularly, it is believed that two slits per cell is the preferred minimum in order to provide substantial margin of safety in the event that the venting means is subjected to numerous exposures to ignition.

Another advantage of the present invention is the provision of venting means which are self-sealing when exposed to a persistent flame. This characteristic is accomplished by constructing at least a portion of the material surrounding the slit from a meltable material such as polypropylene and copolymers thereof which is meltable and which responds to a persistent flame by melting to close or seal the slit and to thereby extinguish the flame by cutting off the fuel gas which is being supplied to the flame through the slit. It is important during this melting process to ensure that no portion of the slit increases in width beyond the size of 0.007 inches, and more preferably is maintained within the range of 0.004 to 0.005 plus or minus 0.001 inches. In the event that the melting of material surrounding the slit should act to enlarge the slit width over the aforementioned dimensions, a spark or flame from the not yet fully extinguished flame on the exterior of the venting means would then be allowed to pass through the venting means into the interior of the vent or battery, thereby causing the possibility of an explosion. Accordingly, the depth of the slit as represented by the small letter "d" in FIG. 5, must comprise a depth of at least 0.040 inches over which depth the preferred width ranges are maintained. As illustrated in the preferred embodiment, the depth of each slit within which these width ranges are maintained is substantially greater than 0.040 inches, and in fact, the depth for the embodiment illustrated is approximately 0.08 of an inch, whereupon a very substantial margin of safety is provided during the melting process against ignition of gases within the vent or the battery itself.

With further regard to the depth of the slits and the distance which must be traversed by the battery gases before they reach the outside of the battery, it can be seen that by proving the interfitting u-shaped raised portions around the prongs and the slots, that battery gas which exits the cap downwardly from the underside of the cap must travel a considerably distance over and around these raised portions before exiting the slots. This considerable distance again enhances the possibility of any flame melting and sealing the gas passageway well before the flame reaches the inside of the cap.

From the above description it may be seen that a battery vent for use on electric storage batteries to sealingly engage one or more battery cells of said battery and to vent battery gases generated by those cells to the atmosphere is provided with a novel means for providing fluid communication between said battery and the atmosphere which means effectively arrests the ignition of flames and/or sparks causing ignition of battery gases in the atmosphere of the vicinity of the vent, while further preventing the transmission of spark or flame from the atmosphere through the novel slit means defined in at least one exterior surface of said vent. It may further be seen from the above that the transmission of ignition from the atmosphere through the various slits is prevented by constructing each slit to have a width of less than 0.007 inches and preferably between 0.004 and 0.005 inches, and by otherwise sealing the battery vent and/or openings to the battery to prevent the venting of battery gases except through said slit means.

It will be understood that various changes in the details, materials and arrangement of arts which have been herein described and illustrated in order to explain the nature of this invention may be made by those skilled in the art within the principle and scope of the invention as expressed in the following claims.

It will further be understood that the "Abstract of Disclosure" set forth above is intended to provide a nonlegal, technical statement of the contents of the disclosure in compliance with the Rules of Practice of the U.S. Patent and Trademark Office, and is not intended to limit the scope of the invention described and claimed herein.

What is claimed is:

1. A vent cap for use on an electric storage battery to sealingly engage the openings of said battery and to vent battery gases to the atmosphere, said vent cap comprising:
    (a) a bottom member adapted to sealingly fit into said openings in said battery and to communicate the interior of said battery to the atmosphere, said bottom member having at least one slot through the underside thereof and an annular sidewall;
    (b) a top member fitted within said annular sidewall and snap-fitted through said slot in said bottom member, said top member having at least one prong member extending downward therefrom through said slot, and said prong member being narrower than said slot, whereby at least one first slit is formed between said slot and said prong on the underside of said bottom member;
    (c) said top member further having at least one indentation in the circumference thereof adjacent said annular sidewall, whereby a second slit is formed between said top member and said bottom member.

2. A vent cap as claimed in claim 1, wherein:
    (a) said bottom member has a plurality of slots through the underside thereof;
    (b) said top member has a plurality of prongs extending through said slots in said bottom member; and
    (c) said top member has a plurality of indentations around the circumference thereof; whereby a plurality of first and second slits are formed.

3. A vent as claimed in claim 2, wherein said first and second slits have a width of approximately 0.004 to 0.005 of an inch and a depth of at least 0.040 of an inch.

4. A vent as claimed in claim 2, wherein said top and bottom members are comprised of meltable material adjacent said first and second slits.

* * * * *